US012782996B2

(12) United States Patent
Lien et al.

(10) Patent No.: US 12,782,996 B2
(45) Date of Patent: Nov. 3, 2026

(54) VOLTAGE REFERENCE CIRCUIT WITH OFFSET TRIMMING USING FIELD-EFFECT TRANSISTORS

(71) Applicant: TAIWAN SEMICONDUCTOR MANUFACTURING COMPANY LTD., Hsinchu (TW)

(72) Inventors: Bei-Shing Lien, Taipei City (TW); Szu-Lin Liu, Hsinchu City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 7 days.

(21) Appl. No.: 18/983,422

(22) Filed: Dec. 17, 2024

(65) Prior Publication Data

US 2026/0056569 A1 Feb. 26, 2026

Related U.S. Application Data

(60) Provisional application No. 63/685,267, filed on Aug. 21, 2024.

(51) Int. Cl.
*G05F 3/26* (2006.01)

(52) U.S. Cl.
CPC .................................... *G05F 3/262* (2013.01)

(58) Field of Classification Search
CPC ........................................................ G05F 3/262
See application file for complete search history.

(56) References Cited

U.S. PATENT DOCUMENTS 6,426,669 B1 7/2002 Friedman et al.
9,634,648 B1 * 4/2017 Zhou ...................... G05F 3/245
(Continued)

FOREIGN PATENT DOCUMENTS

TW 200944984 A 11/2009
TW 201426240 A 7/2014

OTHER PUBLICATIONS

U.S. Pat. No. 9,018,934 B2 is the US counterpart application of TW 201426240 A.
(Continued)

*Primary Examiner* — Metasebia T Retebo
(74) *Attorney, Agent, or Firm* — WPAT LAW; Anthony King

(57) ABSTRACT

An integrated circuit is provided, which includes a first voltage source, a second voltage source, a first trimming circuit, and a second trimming circuit. The first voltage source is configured to generate a first voltage which monotonically decreases with an absolute temperature of the integrated circuit. The second voltage source is configured to generate a second voltage which monotonically increases with the absolute temperature. The first and second voltages are compensated to generate a reference voltage. The first trimming circuit includes trimming devices arranged in parallel to the first voltage source, and adjusts the first voltage using the trimming devices to reduce a temperature coefficient of the reference voltage. The second trimming circuit is configured to multiply the reference voltage by a predetermined multiplication ratio to adjust an offset of the reference voltage to generate an output reference voltage at an output terminal of the integrated circuit.

20 Claims, 13 Drawing Sheets

(56) References Cited

U.S. PATENT DOCUMENTS

| | | | | |
|---|---|---|---|---|
| 2013/0015834 | A1 * | 1/2013 | Glibbery | G05F 3/30 323/313 |
| 2022/0357759 | A1 * | 11/2022 | Kundu | G05F 1/468 |

OTHER PUBLICATIONS

English Abstract Translation of TW 201426240 A.
English Abstract Translation of TW 200944984 A.
Bei-Shing Lien et al., "Voltage Reference Circuit Using Field-Effect Transistors", unpublished U.S. Appl. No. 18/760,661, filed Jul. 1, 2024, which disclosure is incorporated by reference in its entirety.

* cited by examiner

VOLTAGE REFERENCE CIRCUIT WITH OFFSET TRIMMING USING FIELD-EFFECT TRANSISTORS

CROSS-REFERENCE TO RELATED APPLICATION(S)

This application claims the benefit of U.S. Provisional Application No. 63/685,267, filed Aug. 21, 2024, the entire disclosure of which is incorporated by reference herein.

BACKGROUND

The current trend in miniaturizing integrated circuits (ICs) has led to the development of smaller, more efficient devices with increased functionality and higher operating speeds. This miniaturization process has also brought about more stringent design and manufacturing requirements, as well as reliability challenges. Electronic design automation (EDA) tools are utilized to create, optimize, and validate standard cell layout designs for integrated circuits, ensuring that they meet both design and manufacturing specifications.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features can be arbitrarily increased or reduced for clarity of discussion.

DETAILED DESCRIPTION

Figure 1:
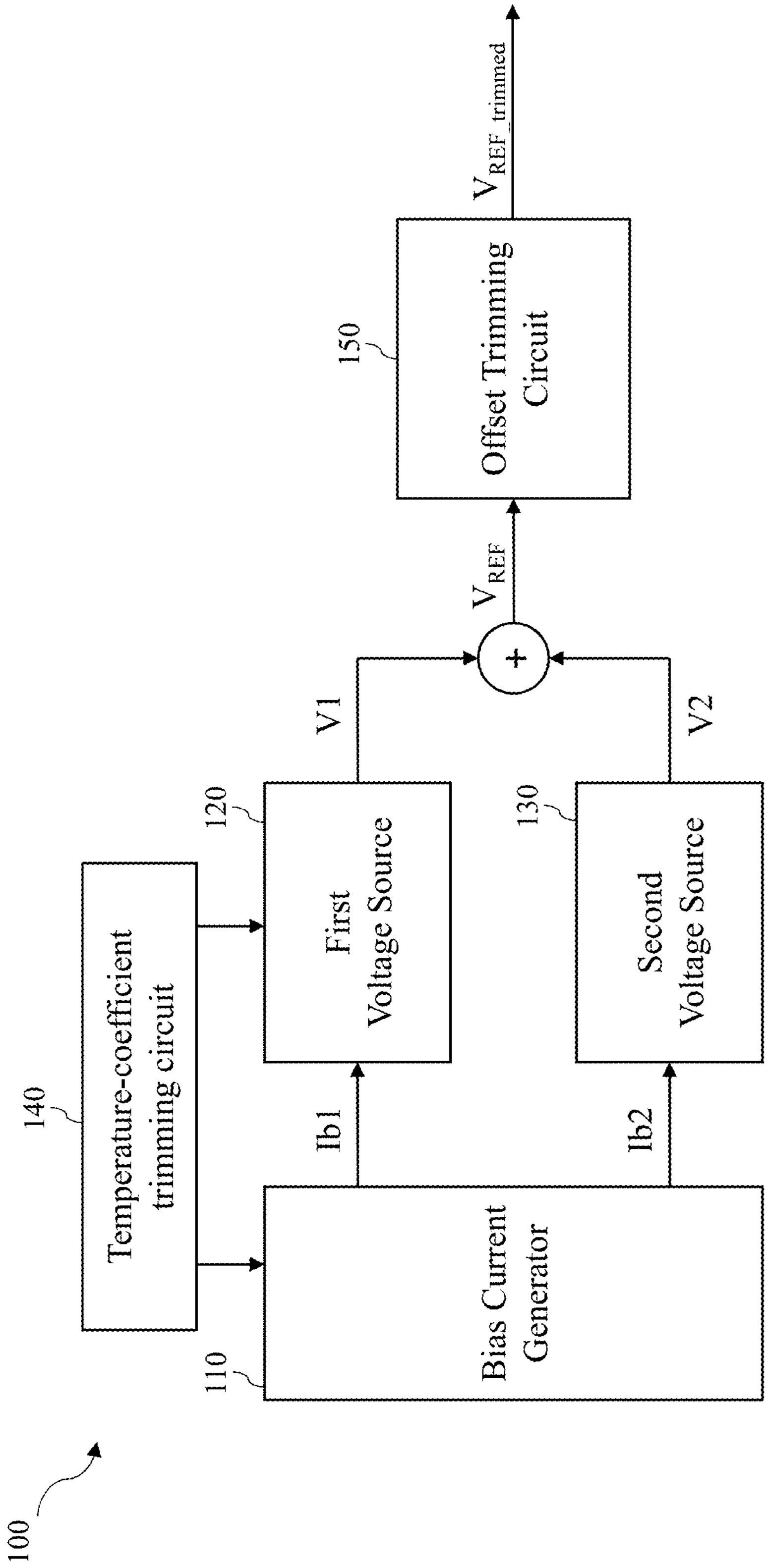
FIG. 1 is a block diagram of a voltage reference circuit in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features can be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, it will be understood that when an element is referred to as being "connected to" or "coupled to" another element, it can be directly connected to or coupled to the other element, or intervening elements can be present.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device can be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

In some embodiments, a voltage reference circuit including a first trimming circuit and a second trimming circuit is provided. The first trimming circuit is configured to reduce a temperature coefficient of a reference voltage generated by the voltage reference circuit, while the second trimming circuit is configured to adjust an offset of the reference voltage to generate an output reference voltage with an inaccuracy level lower than that of the reference voltage.

FIG. 1 is a block diagram of a voltage reference circuit in accordance with some embodiments of the present disclosure.

In some embodiments, the voltage reference circuit 100 shown in FIG. 1 includes functions of temperature-coefficient trimming and offset trimming, thereby providing an output reference voltage $V_{REF\_trimmed}$ with higher accuracy compared to a reference voltage $V_{REF}$ generated therein. The voltage reference circuit 100 includes a bias current generator 110, a first voltage source 120, a second voltage source 130, a temperature-coefficient trimming circuit 140, and an offset trimming circuit 150, as depicted in FIG. 1. The bias current generator 110 may be configured to generate a first bias current Ib1 and a second bias current Ib2 that are provided to the first voltage source 120 and the second voltage source 130, respectively.

In some embodiments, the first voltage source 120 may be configured to generate a first voltage V1, which monotonically decreases with an absolute temperature of the voltage reference circuit 100, based on the first bias current Ib1. The second voltage source 130 may be configured to generate a second voltage V2, which monotonically increases with the absolute temperature of the voltage reference circuit 100, based on the second bias current Ib2. Both the first voltage source 120 and the second voltage source 130 may include one or more metal-oxide semiconductor field-effect transistors (MOSFETs) and/or stacked gate devices of MOSFETs. In some embodiments, the MOSFETs used in the first voltage source 120 and the second voltage source 130 are not limited to SVT (standard threshold voltage) transistors. Additionally or alternatively, HTV (high threshold voltage), LVT (low threshold voltage), SLVT (super-low threshold voltage), and ULVT (ultra-low threshold voltage) transistors can also be used.

Figure 2:
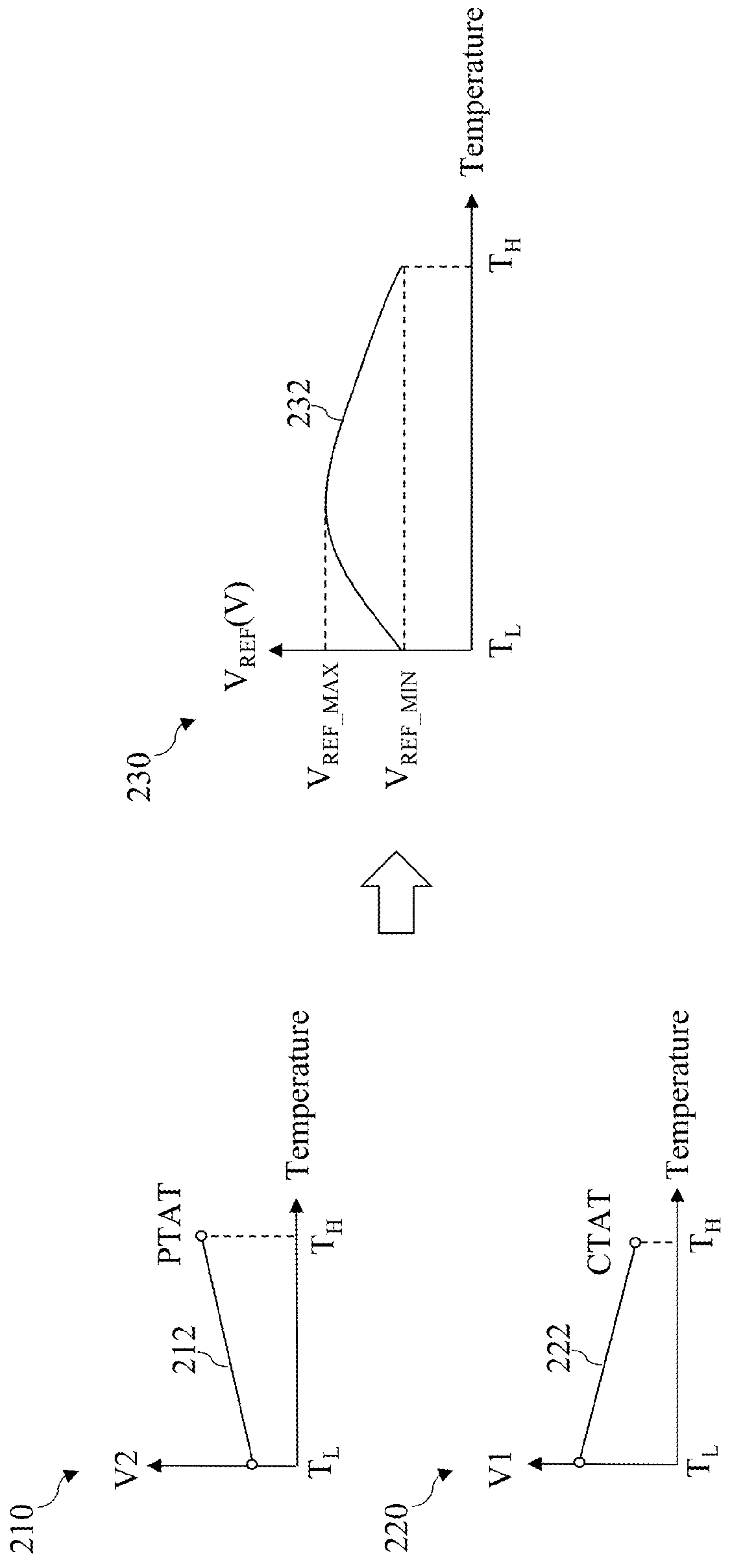
FIG. 2 is a diagram illustrating a voltage-temperature curve resulting from the compensation between the first voltage and the second voltage, in accordance with some embodiments of the present disclosure.

The first voltage V1 is compensated with the second voltage V2 to generate a reference voltage $V_{REF}$. The working principle of this compensation is detailed with reference to FIG. 2, which illustrates a voltage-temperature curve resulting from the compensation between the first voltage V1 and the second voltage V2, in accordance with some embodiments of the present disclosure. In some embodiments, the first voltage V1 is complementary to the absolute temperature (CTAT), whereas the second voltage V2 is proportional to the absolute temperature (PTAT), as shown by curves 222 and 212 in diagrams 220 and 210, respectively. The compensation of the first voltage V1 with the second voltage V2 results in the generation of a reference voltage VREF, which exhibits temperature-voltage relationships as depicted by curve 232 in diagram 230.

Specifically, the voltage reference circuit 100 is designed to work within an operational temperature range defined by an upper temperature TH and a lower temperature TL, indicating that the reference voltage $V_{REF}$ and output reference voltage $V_{REF\_trimmed}$ being suitable for all PVT (process, voltage, and temperature) combinations within the operation temperature range. In some embodiments, the upper temperature TH and the lower temperature TL may be 120° C. and −40° C., respectively, but the present disclosure is not limited thereto. The upper temperature TH and lower temperature TL can be adjusted according to practical needs. Additionally, the reference voltage $V_{REF}$ is subject to variation between voltage $V_{REF\_MAX}$ and $V_{REF\_MIN}$ within the operational temperature range between the upper temperature TH and the lower temperature TL. Accordingly, the temperature coefficient TC of the reference voltage $V_{REF}$ can be expressed using equation (1) as follows.

$$TC = \frac{V_{REF\_MAX} - V_{REF\_MIN}}{V_{REF\_AVG}(T_H - T_L)} \times 10^6 (\text{ppm/°C.}) \quad (1)$$

In equation (1), $V_{REF\_AVG}$, which can be referred to as a nominal voltage $V_{nominal}$, denotes the average temperature of the reference voltage $V_{REF}$ at a specified temperature (often at the room temperature, e.g., 25° C.).

Figure 3:
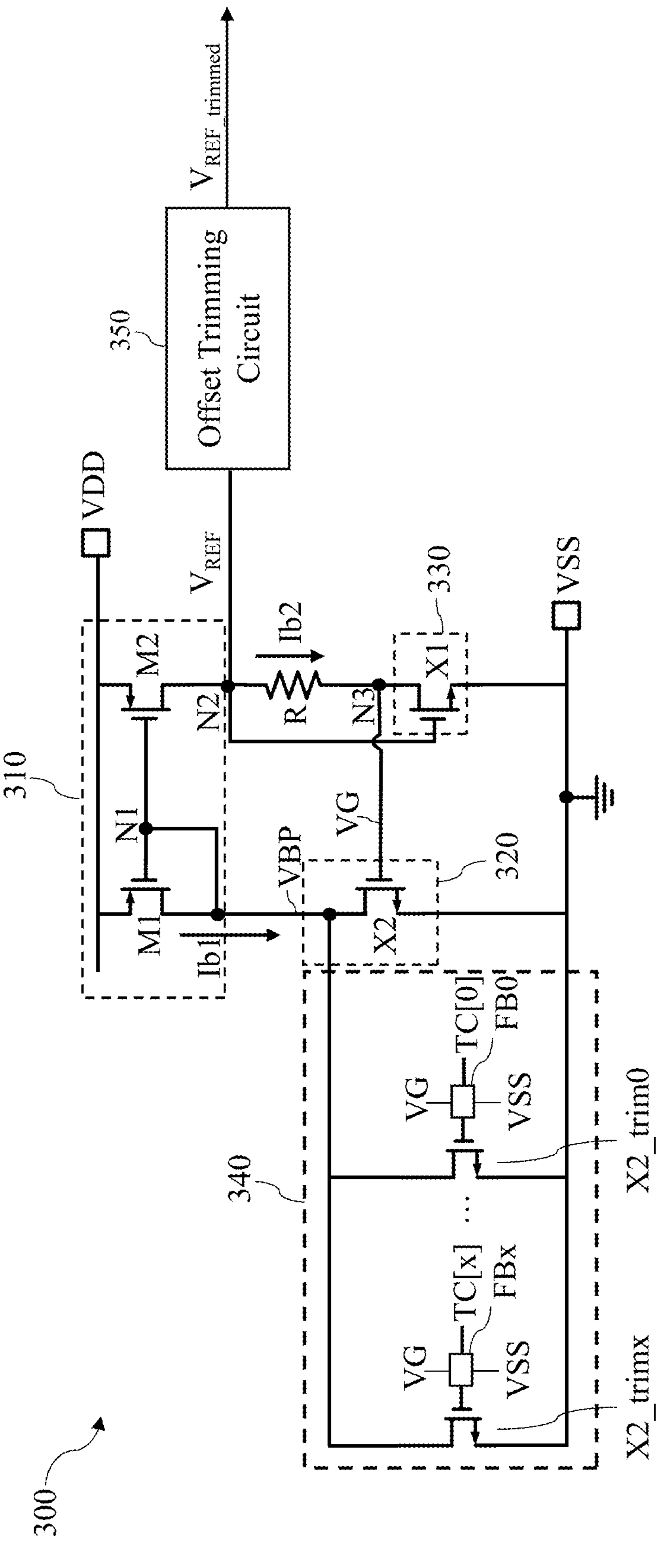
FIG. 3 is a schematic diagram of a voltage reference circuit in accordance with some embodiments of the present disclosure.
Figure 4B:
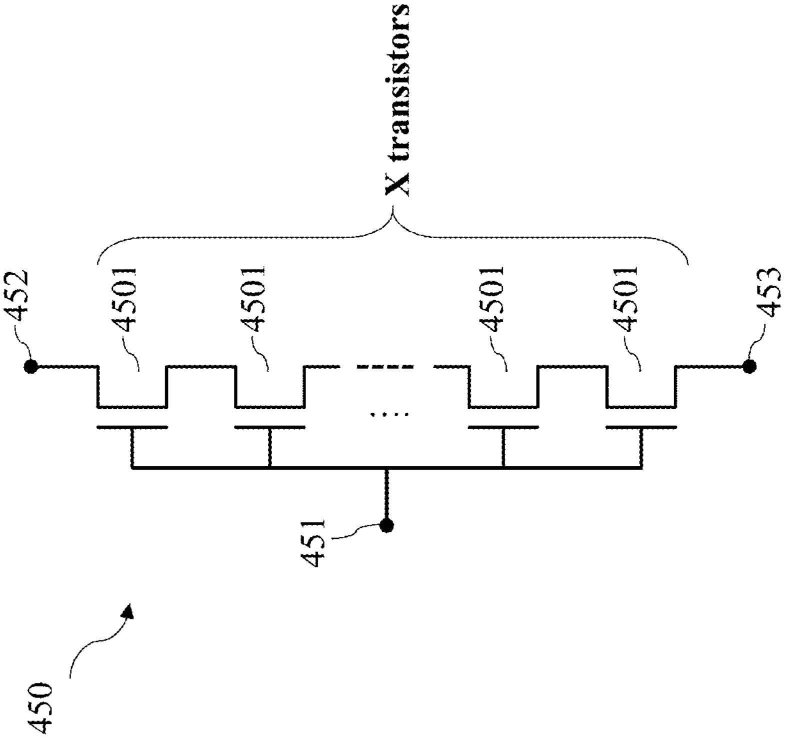
FIG. 4B is an equivalent circuit diagram of the stacked gate device in FIG. 4A.
Figure 4A:
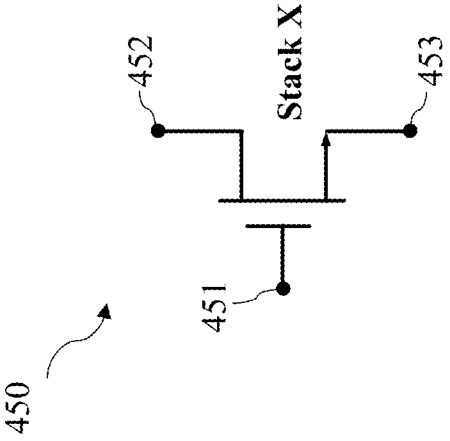
FIG. 4A is a diagram of a stacked gate device in accordance with some embodiments of the present disclosure.

FIG. 3 is a schematic diagram of a voltage reference circuit in accordance with some embodiments of the present disclosure. FIG. 4A is a diagram of a stacked gate device in accordance with some embodiments of the present disclosure. FIG. 4B is an equivalent circuit diagram of the stacked gate device in FIG. 4A.

In some embodiments, the voltage reference circuit 100 shown in FIG. 1 can be implemented using the voltage reference circuit 300, which is a bandgap voltage reference circuit capable of generating an output reference voltage $V_{REF\_trimmed}$. It should be noted the embodiment of the voltage reference circuit 300 shown in FIG. 3 serves to describe the operations of the voltage reference circuit 100 shown in FIG. 1, which may alternatively implemented by other voltage reference circuit with the similar functional blocks.

In some embodiments, the voltage reference circuit 300 may include a bias current generator 310, temperature-sensitive devices 320 and 330, a temperature-coefficient trimming circuit 340, and an offset trimming circuit 350, as depicted in FIG. 3. The bias current generator 310 includes a current mirror formed by transistors M1 to M2, which may be field-effect transistors (FETs, referred as "transistors" hereafter). Each of the transistors M1 to M2 has a gate terminal and a channel between a source terminal and a drain terminal. The bias current (e.g., Ib1 and Ib2) passing through the channel depends on the voltage difference applied to the gate terminal of each transistor M1 to M2.

The temperature-sensitive device 330 and 320 may be implemented using stacked gates devices X1 and X2, respectively. Additionally, the temperature-coefficient trimming circuit 340 includes a plurality of stacked gate devices, such as X2_trim0 to X2_trimx. Each of the stacked gate devices X1 and X2 includes a plurality of field-effect transistors stacked together. The references X1 and X2 are also used to represent the number of FETs connected in series in each respective stacked gate devices X1 and X2. Additionally, each of the stacked gate devices X2_trim0 to X2_trimx have the same number of stacked transistors as the stacked gate device X2 within the temperature-sensitive device 320, but the numbers of finger structures of the stacked gate devices X2_trim0 to X2_trimx may differ from that of the stacked gate device X2. The details of a stacked gate device are described as follows.

In some embodiments, a stacked gate device 450, also known as "stack X" in FIG. 4A, may be regarded as a three-terminal transistor device with a gate terminal 451, a source/drain (S/D) terminal 452, and a source/drain terminal 453. The equivalent circuit diagram of the stacked gate device 450 includes a plurality of transistors 4501 arranged in a cascode structure or a stack structure, as shown in FIG. 4B. The total number of stacked transistors 4501 is denoted as an integer X. For example, the gate terminals of the transistors 4501 are connected together to form the gate terminal 451 of the stacked gate device 450. Additionally, the transistors 4501 may be N-type FETs, and the N-type channels of the transistors 4501 (e.g., X transistors 4501) are connected in series between the (S/D) terminal 452 and the (S/D) terminal 453 of the stacked gate device 450. For example, the (S/D) terminal of the first transistor 4501 serves as the (S/D) terminal 452 of the stacked gate device 450, and a (S/D) terminal of the first transistor 4501 is connected to a (S/D) terminal of the second transistor 4501, a (S/D) terminal of the second transistor 4501 is connected to a (S/D) terminal of the third transistor 4501, . . . , and so on. In other words, for each integer n between 1 to X−1, the (S/D) terminal of the n-th transistor 4501 is connected to the (S/D) terminal of the (n+1)-th transistor 4501. Accordingly, the (S/D) terminal of the last transistor 4501 (i.e., X-th transistor 4501) serves as the (S/D) terminal 453 of the stacked gate device 450.

Figure 4C:
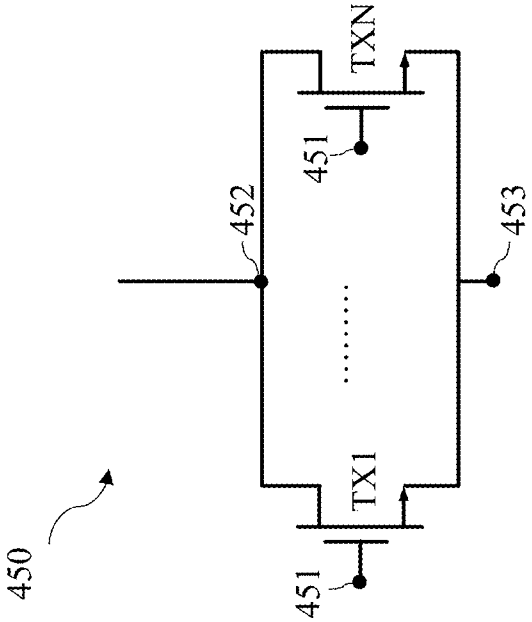
FIG. 4C is a diagram of a stacked gate device with multiple finger structures in accordance with some embodiments of the present disclosure.
Figure 4D:
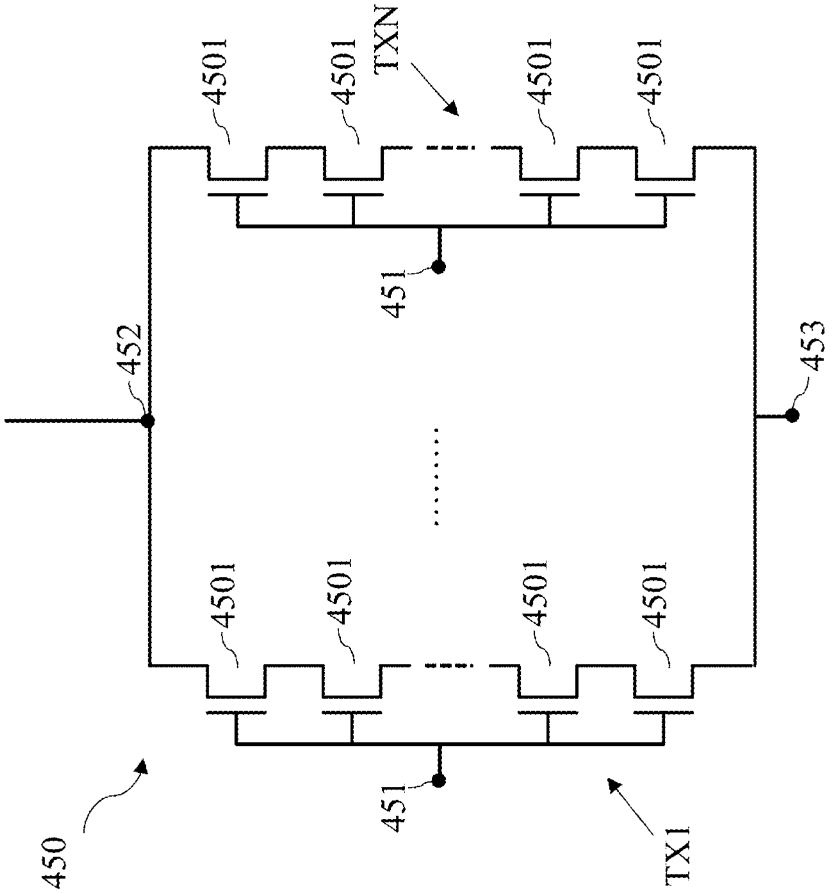
FIG. 4D is an equivalent circuit diagram of the stacked gate device in FIG. 4C.

FIG. 4C is a diagram of a stacked gate device with multiple finger structures in accordance with some embodiments of the present disclosure. FIG. 4D is an equivalent circuit diagram of the stacked gate device in FIG. 4C.

In some embodiments, the stacked gate device 450 shown in FIG. 4A includes one or more stacked gate devices TX1 to TXN arranged in parallel, as shown in FIG. 4C, where N is a positive integer. Each of the stacked gate devices TX1 to TXN can be regarded as a finger structure or a "finger", which includes X transistors 4501 arranged in a cascode structure or a stack structure, as shown in FIG. 4D. For example, the channel of the transistors 4501 within each stacked gate device TX1 to TXN are connected in series to form the respective channel of each stacked gate device TX to TXN. Additionally, the channel of each stacked gate device TX1 to TXN is coupled between the (S/D) terminal 452 and (S/D) terminal 453 of the stacked gate device 450, while the gate terminals of stacked gate devices TX1 to TXN are connected to the gate terminal 451 of the stacked gate device 450. When the stacked gate device 450 includes one finger structure, the equivalent circuit diagram of the stacked gate device 450 can be referred to FIG. 4B.

It should be noted that the transistors 4501 within the stacked gate devices TX1 to TXN may be fabricated within the same process, and thus have substantially the same electrical characteristics, such as channel width, channel length, threshold voltage, and transconductance. The design of a stacked gate device X with one or more finger structures shown in FIGS. 4C and 4D can applied to the stacked gate devices X1, X2, and X2_trim0 to X2_trimx in FIG. 3, with the transistors therein having substantially the same electrical characteristics.

In some embodiments, the gate-to-source voltage Vgs of the stacked gate device 450 shown in FIG. 4A can be expressed by equation (2) as follows.

$$Vgs = Vth + \sqrt{\frac{2 \cdot I \cdot L1}{\mu \cdot Cox \cdot W1}} \tag{2}$$

where Vth denotes the threshold voltage of the stacked gate device 450; I denotes the bias current flowing through the stacked gate device 450; L1 and W1 denotes the channel length and channel width of the stacked gate device 450, respectively; Cox denotes the gate oxide capacitance of the stacked gate device 450 per unit area; y denotes the mobility of electrons. It should be noted that as the temperature increases, the electrons become more energetic and the energy barrier between the (S/D) terminal 453 and the channel of the stacked gate device 450 is lower, allowing more carriers to be present in the channel, which in turn reduces the threshold voltage. In other words, when the bias current I is fixed, the threshold voltage Vth decreases as the temperature increases, causing the gate-to-source voltage Vgs of the stacked gate device 450 to monotonically decrease with the absolute temperature (e.g., complementary to the absolute temperature, CTAT).

Figure 5B:
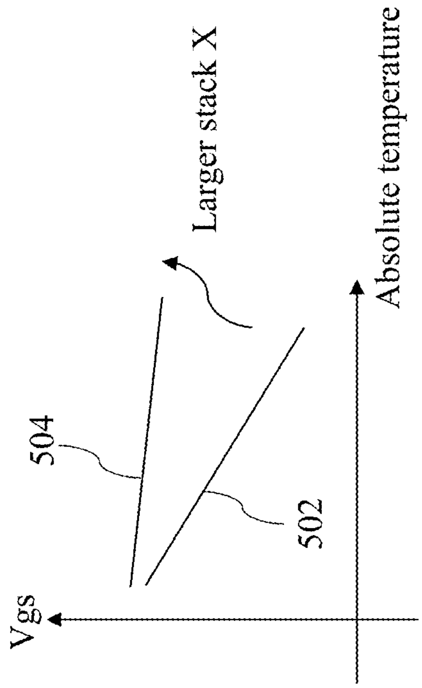
FIG. 5B is a diagram illustrating variations of a voltage-temperature curve of the stacked gate device in FIG. 5A.
Figure 5A:
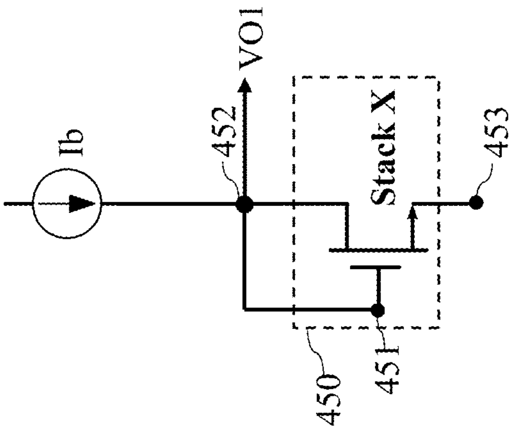
FIG. 5A is a schematic diagram of a stacked gate device in a diode-connected configuration in accordance with some embodiments of the present disclosure.
Figure 6A:
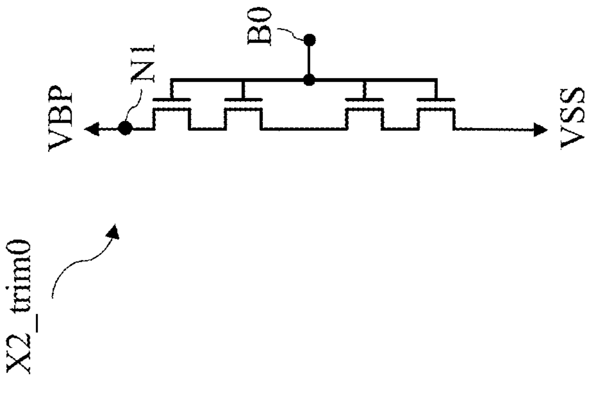
FIGS. 6A-6D are schematic diagrams of trimming stacked gate devices with different number of finger structures in accordance with some embodiments of the present disclosure.
Figure 6B:
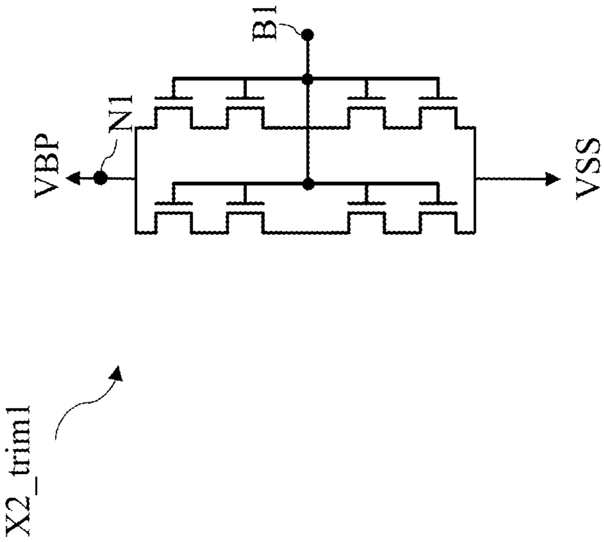
Figure 6D:
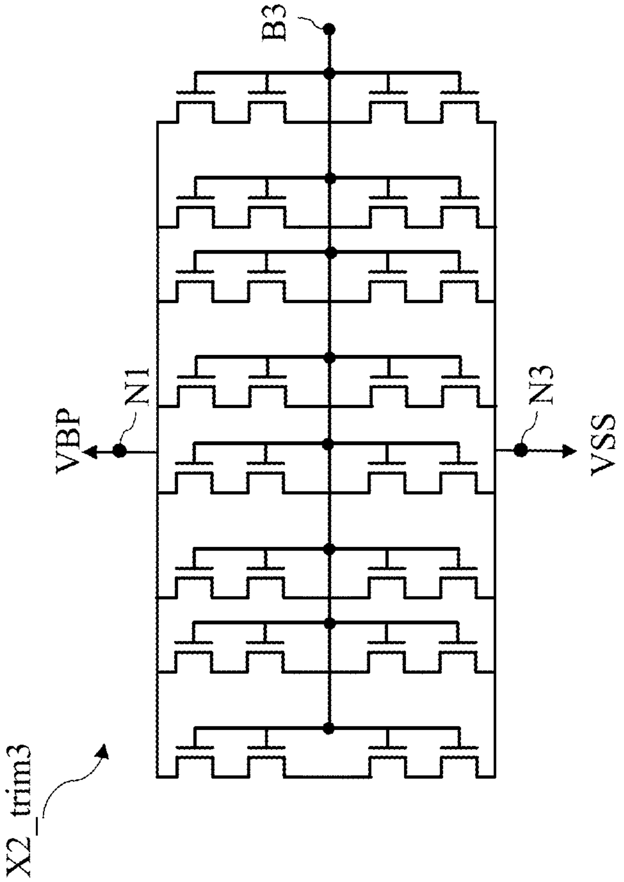
Figure 6C:
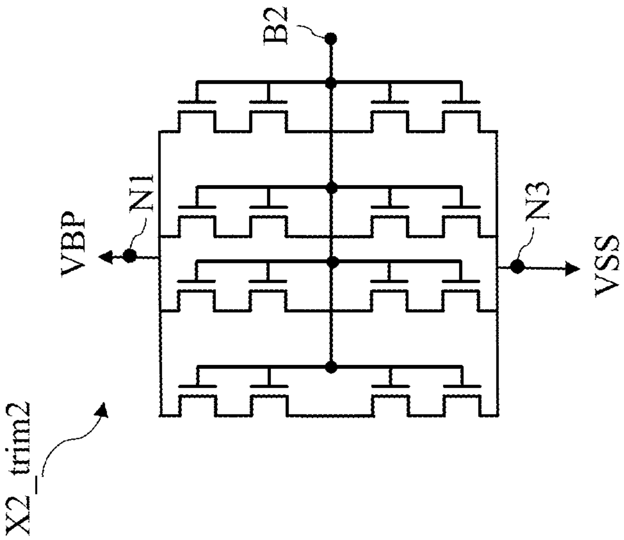

FIG. 5A is a schematic diagram of a stacked gate device in a diode-connected configuration in accordance with some embodiments of the present disclosure. FIG. 5B is a diagram illustrating variations of a voltage-temperature curve of the stacked gate device in FIG. 5A.

In some embodiments, the stacked gate device 450 is in a diode-connected configuration, indicating that the gate terminal 451 of a stacked gate device 450 is connected to the (S/D) terminal 452 of the stacked gate device 450, and a bias current Ib is provided to the stacked gate device 450, as shown in FIG. 5A. In such case, the voltage difference (e.g., gate-to-source voltage) Vgs between the gate terminal 451 and (S/D) terminal 453 of the stacked gate device 450 decreases as the absolute temperature of the stacked gate device X increases, as shown by curve 502 in FIG. 5B. Additionally, the downward slope of the voltage-temperature curve depends on the number of stacked transistors within the stacked gate device X. For example, as the number of stacked transistors increases (e.g., a larger stack X), the slope of the V-T (voltage-temperature) curve decreases, as shown by curve 504 in FIG. 5B, indicating that the voltage difference Vgs between the gate terminal 451 and the (S/D) terminal 453 of the stacked gate device X becomes less sensitive to changes in absolute temperature. As a result, the output voltage VO1 generated by the stacked gate device 450 monotonically decreases in accordance with the absolute temperature (e.g., complementary to the absolute temperature, CTAT). Accordingly, the stacked gate device 450 in the configuration shown in FIG. 5A can be regarded as a CTAT device.

In some embodiments, the stacked gate device 450 in the configuration shown in FIG. 4A has a similar downward V-T curve as shown by curve 502 in FIG. 5B. As the number of stacked transistors increases (e.g., a larger stack X), the downward slope of the V-T curve decreases, as shown by curve 504 in FIG. 5B, indicating that the voltage difference Vgs between the gate terminal 451 and the (S/D) terminal 453 of the stacked gate device X becomes less sensitive to changes in absolute temperature. That is, the downward slope of the V-T (Vgs vs. absolute temperature) curve of the stacked gate device 450 can become less steep as the number of stacked transistors within the stacked gate device 450 increases. This mechanism for the V-T curve can be applied to the stacked gate devices X1 and X2 shown in FIG. 3.

Attention now is directed back to FIG. 3. In some embodiments, the temperature-sensitive devices 330 and 320 include stacked gate devices X1 and X2, respectively. The number X1 of the stacked transistors within the stacked gate device X1 is greater than the number X2 of the stacked transistors within the stacked gate device X2. Based on the embodiments of FIGS. 5A-5B described above, it is seen that both the stacked gate devices X1 and X2 are CTAT devices, and the gate-to-source Vgs1 of the stacked gate device X1 and the gate-to-source Vgs2 of the stacked gate device X2 decrease as the absolute temperature of the voltage reference circuit 300 increases. It should be noted that since the number X1 is greater than the number X2, the stacked gate device X1 is less sensitive to changes in absolute temperature compared to the stacked gate device X2. Thus, the decrement of the gate-to-source voltage Vgs1 of the stacked gate device X1 is less than that of the gate-to-source voltage Vgs2 of the stacked gate device X2, indicating that the voltage difference Vgs1−Vgs2 increases as the absolute temperature increases. Additionally, while the bias current Ib2 can be calculated as (Vgs1−Vgs2)/R, it means that the bias current Ib2 flowing through the stacked gate device X1 increases as the absolute temperature increases. Therefore, the bias current Ib2 is a PTAT current which monotonically increases with the absolute temperature of the voltage reference circuit 300.

In some embodiments, the reference voltage $V_{REF}$ is the same as the gate-to-source voltage Vgs1 of the stacked gate device X1, as depicted in FIG. 3. According to equation (2), the threshold voltage Vth of the stacked gate device X1 decreases as the absolute temperature increases, while the bias current Ib2 increases as the absolute temperature increases, indicating that the temperature-sensitive device 330 acts as both a PTAT voltage source and a CTAT voltage source. This means that CTAT scheme of the threshold voltage Vth of the stacked gate device X1 can be compensated with PTAT scheme of the bias current Ib2 flowing through the stacked gate device X1, resulting in a self-compensated temperature coefficient of the reference voltage $V_{REF}$. Additionally, the reference voltage $V_{REF}$ generated at node N2 could achieve a temperature coefficient substantially equal to 0 with an appropriate design of the number of stacked transistors within the stacked gate devices X1 and X2, and the number of finger structures within the stacked gate device X2. The details for adjusting the number of finger structures within the stacked gate device X2 using the temperature-coefficient trimming circuit 340 are described as follows.

In some embodiments, the reference voltage $V_{REF}$ generated at node N2 can be expressed in another way, such as $V_{REF}$=Vgs2+Ib2*R, where Vgs2 denotes the gate-to-source voltage Vgs2 of the stacked gate device X2, and Ib2*R denotes the voltage drop across the resistor R. While the gate-to-source voltage Vgs2 is CTAT and the bias current Ib2 is PTAT, the CTAT scheme can also be compensated with the PTAT scheme in another way to generate the reference voltage $V_{REF}$, resulting in a self-compensated temperature coefficient of the reference voltage $V_{REF}$.

In some embodiments, the gate terminals of transistor M1 and M2 are electrically connected to node N1, and the source terminals of transistors M1 and M2 are electrically connected to the power supply voltage VDD. Since transistors M1 and M2 have the same gate-to-source voltage Vgs, transistors M1 and M2 may be configured to function as a first current mirror, and the bias current Ib2 passing through the channel of transistor M2 is proportional to the bias current Ib1 passing through the channel of transistor M1. When transistors M1 and M2 are designed with substantially the same electrical characteristics, such as channel width, channel length, threshold voltage, and transconductance, the bias current Ib2 flowing through transistor M2 is substantially equal to the bias current Ib1 flowing through transistor M1. Thus, transistor M1 may function as a current source as well as transistor M2. As described above, the bias current Ib2 is a PTAT current, indicating that the bias current Ib1 is also a PTAT current.

In some embodiments, the temperature-coefficient trimming circuit 340 may be configured to adjust (e.g., fine-tune) the voltage-temperature falling rate of the temperature-sensitive device 320 using a dynamic element matching ("DEM") technique, resulting in the reference voltage $V_{REF}$ generated at node N2 to have a lower temperature coefficient compared to the reference voltage $V_{REF}$ without using the temperature-coefficient trimming circuit 340. The temperature-coefficient trimming circuit 340 may include a plurality of trimming stacked gate devices X2_trim0 to X2_trimx. The gate terminal of each trimming stacked gate device X2_trim0 to X2_trimx is coupled to a respective bit of a trimming code signal TC[0:x] through a corresponding buffer circuit FB0 to FBx. The drain terminal and source terminal of each trimming stacked gate device X2_trim0 to X2_trimx is coupled between voltage VBP, the voltage at node N1, and the ground node. Additionally, each of the buffer circuits FB0 to FBx may be supplied with voltage VG, the voltage at node N3, and a ground voltage VSS, as shown in FIG. 3.

It should be noted that each of trimming stacked gate devices X2_trim0 to X2_trimx can include one or more finger structures arranged in parallel, where each finger structure has an equal number of stacked transistors as the stacked gate device X2. Additionally, trimming stacked gate devices X2_trim0 to X2_trimx can have an equal number or different numbers of finger structures, depending on the type of the trimming code signal TC[0:x] being used. The details thereof are described below with reference to FIGS. 6A to 6D.

In some embodiments, referring to FIG. 3, the number of fingers coupled to the stacked gate device X2 in parallel can be adjusted using the temperature-coefficient trimming circuit 340. For brevity, the temperature-coefficient trimming circuit 340 within the voltage reference circuit 300 includes four trimming stacked gate devices X2_trim0 to X2_trim3 that are controlled by respective bits of the trimming code signal TC[0:3] through respective buffer circuits FB0 to FB3. For example, the buffer circuits FB0 to FB3 are supplied with the voltage VG (e.g., gate voltage of the stacked gate device X2) and the ground voltage VSS. Additionally, each bit of the trimming code signal TC[0:3] may be passed to the gate terminals B0 to B3 of the trimming stacked gate devices X2_trim0 to X2_trim3 through the respective buffer circuits FB0 to FB3. Additionally, the voltage range of the each bit of the trimming code signal TC[0:3] is between the voltage VG and the ground voltage VSS.

In some embodiments, each of the trimming stacked gate device X2_trim0 to X2_trim3 has the same number of finger structures, such as 1 to N, where N is a positive integer. When thermal meter coding is used for the temperature-coefficient trimming circuit 340, each bit of the trimming code signal TC[0:3] can control an equal number of finger structures to couple to the stacked gate device X2 in parallel. For brevity, it is assumed that there are 4 stacked transistors within the stacked gate device X2, and the stacked gate device X2 includes one finger structure. Additionally, each of the trimming stacked gate device X2_trim0 to X2_trim3 includes one finger structure. When the trimming code signal TC[3:0]=4'b1101, the voltage VG is passed to the gate terminals B0, B2, and B3 of the trimming stacked gate device X2_trim0, X2_trim2, and X2_trim3, activating the trimming stacked gate device X2_trim0, X2_trim2, and X2_trim3. Meanwhile, the ground voltage VSS is passed to the gate terminal B1, deactivating the trimming stacked gate device X2_trim1. Accordingly, 3 finger structures are activated to couple to the finger structure of the stacked gate device X2 in parallel, indicating that 4 finger structures in total are used to adjust the downward slope of the V-T (e.g., Vgs2 vs. absolute temperature) curve of the stacked gate device X2, thereby performing temperature-coefficient trimming on the PTAT current (e.g., Ib2=(Vgs1−Vgs2)/R) generated by the voltage reference circuit 300.

In some embodiments, each of the trimming stacked gate device X2_trim0 to X2_trim3 may have different numbers of finger structures, such as powers of 2. For brevity, it is assumed that there are 4 stacked transistors within the stacked gate device X2, and the stacked gate device X2 includes one finger structure. Additionally, the trimming stacked gate device X2_trim0 to X2_trim3 include 1, 2, 4, and 8 finger structures, respectively, with each finger structure including 4 stacked transistors, as shown in FIGS. 6A-6D. When binary coding is used for the temperature-coefficient trimming circuit 340, each bit of the trimming code signal TC[0:3] can control different numbers of finger structures to couple to the stacked gate device X2 in parallel. When the trimming code signal TC[3:0]=4'b1101, the voltage VG is passed to the gate terminals B0, B2, and B3 of the trimming stacked gate device X2_trim0, X2_trim2, and X2_trim3, activating the trimming stacked gate device X2_trim0, X2_trim2, and X2_trim3. Meanwhile, the ground voltage VSS is passed to the gate terminal B1, deactivating the trimming stacked gate device X2_trim1. Accordingly, 13 (e.g., 1+4+8) finger structures are activated to couple to the finger structure of the stacked gate device X2 in parallel, indicating that 14 finger structures in total are used to adjust the downward slope of the V-T (e.g., Vgs2 vs. absolute temperature) curve of the stacked gate device X2, thereby performing temperature-coefficient trimming on the PTAT current (e.g., Ib2=(Vgs1−Vgs2)/R) generated by the voltage reference circuit 300.

Figure 7:
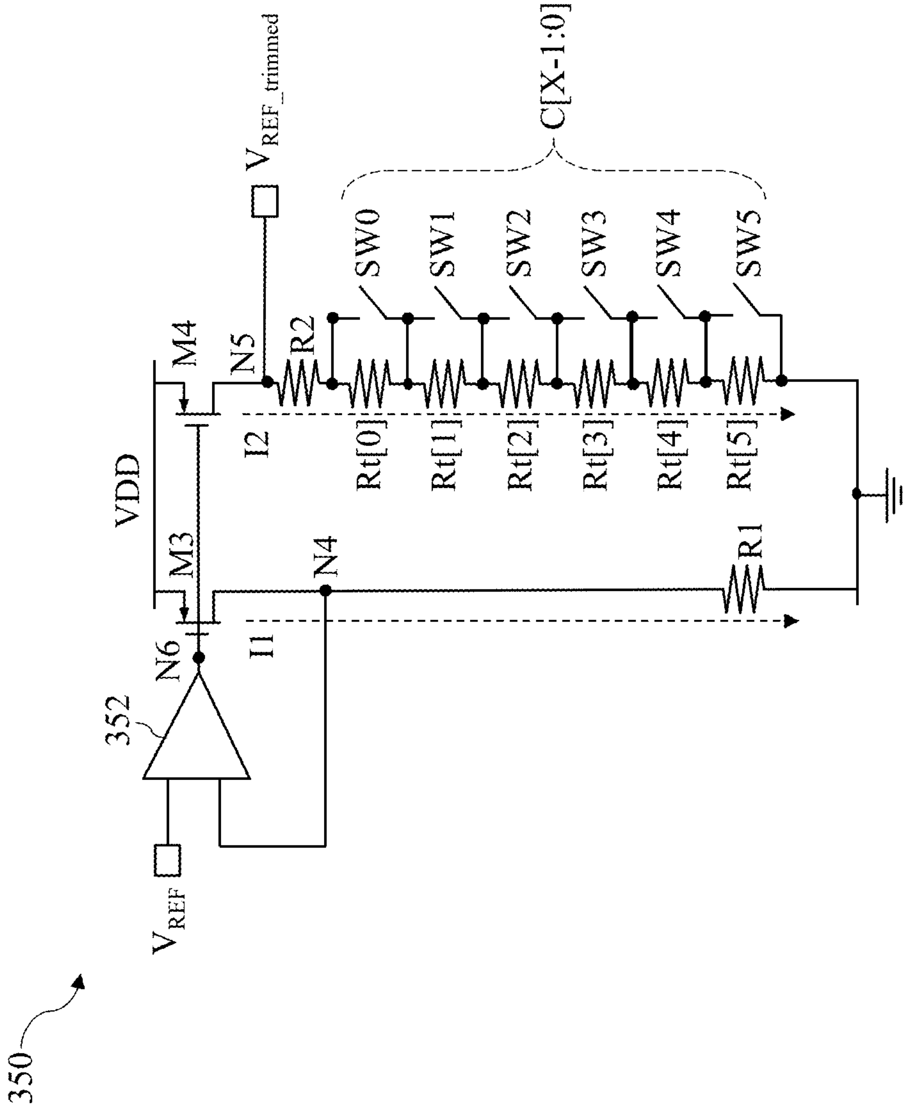
FIG. 7 is a schematic diagram of the offset trimming circuit in accordance with the embodiment of FIG. 3.

FIG. 7 is a schematic diagram of the offset trimming circuit in accordance with the embodiment of FIG. 3. Please refer to both FIG. 3 and FIG. 7.

In some embodiments, the offset trimming circuit 350 may include an operational transconductance amplifier (OTA) 352, transistors M3 and M4, resistors R1 and R2, trimming resistors Rt[0:5], and switches SW0 to SW5, as depicted in FIG. 7. For purposes of description, six switches SW0 to SW5 and six trimming resistors Rt[0:5] are shown in FIG. 7. It should be noted that the number of switches and trimming resistors can be adjusted according to practical needs.

In some embodiments, the OTA 352 may be implemented using a differential amplifier, an operational amplifier, or a circuit with equivalent virtual-ground functions, but the present disclosure is not limited thereto. The OTA 352 may be configured to receive the reference voltage $V_{REF}$ at a first input terminal, and pass the reference voltage $V_{REF}$ to its second input terminal (e.g., node N4) due to virtual grounds of the OTA 352. Accordingly, current I1 flowing from transistor M3 to the ground through resistor R1 can be expressed as: I1=$V_{REF}$/R1.

In some embodiments, the gate terminals of transistors M3 and M4 are both connected to the output terminal (e.g., node N6) of the OTA 352. Additionally, first (S/D) terminals of transistors M3 and M4 receive the power supply voltage VDD, resulting in the transistors M3 and M4 have equal gate-source voltages. Accordingly, transistors M3 and M4 form a current mirror, whereby current I1 flow through transistor M3 is mirrored to current I2 flowing through transistor M4. As a result, current I2 flows from transistor M4 to the ground through resistor R2 and the trimming resistors Rt[0:5] or their respective switches SW0 to SW5, depending on the control signal C[5:0]. In some embodiments, each control bit of the control signal C[5:0] controls the respective switch SW5 to SW0. For brevity, the operations of switch SW0 based on its respective control bit C[0] is described here. For example, when the control bit C[0]=1, switch SW0 is activated (e.g., closed or shorted), indicating that current I2 flowing through the activated switch SW0. Conversely, when the control bit C[0]=0, switch SW0 is deactivated (e.g., opened), indicating that current I2 flowing through the trimming resistor Rt[0]. The operations of switches SW1 to SW5 can be deduced in a similar manner.

In some embodiments, the references Rt[5:0] may also denote the resistances of the corresponding trimming resistors. The resistance values of the trimming resistors Rt[5:0] can be organized in a binary coding scheme aligned with the control signals C[5:0]. For example, the resistances of the respective trimming resistors Rt[5] to Rt[0] can be expressed as: $Rt[5]=2Rt[4]=2^2Rt[3]=2^3Rt[2]=2^4R[1]=2^5Rt[0]$, where the trimming resolution associated with the offset of the output reference voltage $V_{REF\_trimmed}$ is determined by the resistance value of trimming resistor Rt[0], which corresponds to the least significant bit (LSB) (e.g., C[0]) of the control signal C[5:0]. Alternatively, the resistance values of the trimming resistors Rt[5:0] can be organized in a thermal-meter coding scheme aligned with the control signals C[5:0]. For example, the resistances of the respective trimming resistors Rt[5] to Rt[0] can be expressed as: Rt[5]=Rt[4]=Rt[3]=Rt[2]=R[1]=Rt[0], where the trimming resolution is determined by the resistance value of trimming resistor Rt[0], which corresponds to the least significant bit (LSB) (e.g., C[0]) of the control signal C[5:0]. Furthermore, the number of trimming resistors and the width of the control signal C can be increased to 64 when using the thermal-meter coding scheme, thereby implement 64 trimming steps as the binary code scheme.

It should be noted that the number of trimming resistors Rt[5:0] are for purposes of description, and it can be adjusted according to practical needs. Additionally, the trimming resolution of the output reference voltage $V_{REF\_trimmed}$ is based on the total steps of the trimming resistances of the trimming resistors Rt[X−1:0] controlled by the control signal C[X−1:0]. More steps of the trimming resistances can result in a higher resolution of offset trimming.

In some embodiments, current I1 is mirrored to current I2 by the current mirror formed by transistor M3 and M4, the output reference voltage $V_{REF\_trimmed}$ can be calculated as I2*(R2+Rt[0:5]). Accordingly, by replacing current I2 with current I1 which equals $V_{REF}$/R1, the output reference voltage $V_{REF\_trimmed}$ can be expressed using equation (3) as follows.

$$V_{REF\_trimmed} = \left(\frac{R2 + Rt[5:0]}{R1}\right) \cdot V_{REF} \tag{3}$$

In some embodiments, when the value of $$\left(\frac{R2 + Rt[5:0]}{R1}\right)$$

is greater than 1, it indicates that the offset trimming circuit 350 trims up the reference voltage $V_{REF}$, resulting in the output reference voltage $V_{REF}$_trimmed being higher than the reference voltage $V_{REF}$. When the value of $$\left(\frac{R2 + Rt[5:0]}{R1}\right)$$

is equal to 1, it indicates that the offset trimming circuit 350 maintains the reference voltage $V_{REF}$ as the output reference voltage $V_{REF\_trimmed}$, resulting in the output reference voltage $V_{REF\_trimmed}$ being equal to the reference voltage $V_{REF}$. When the value of $$\left(\frac{R2 + Rt[5:0]}{R1}\right)$$

is less than 1, it indicates that the offset trimming circuit 350 trims down the reference voltage $V_{REF}$, resulting in the output reference voltage $V_{REF\_trimmed}$ being lower than the reference voltage $V_{REF}$.

It should be noted that the resistors R1 and R2, along with trimming resistors Rt[5:0], may be fabricated through a back-end of line (BEOL) process, wherein the resistance values are subject to variations inherent in the BEOL process. Since resistors R1 and R2, as well as trimming resistors Rt[5:0], are fabricated through the same BEOL process, their resistance values are likely to exhibit similar variations. For example, if the resistance value of resistor R1 varies by +15% or −10% from its expected resistance value, it suggests that the resistance values of resistor R2 and trimming resistors Rt[5:0] will also vary by +15% or −10% from their expected resistance values. Furthermore, the offset trimming circuit 350 utilizes the ratio of a second resistance (e.g., R2+Rt[5:0]) along a second current path (e.g., path of current I2 from transistor M4 to the ground through resistor R2 and trimming resistors Rt[5:0]) to a first resistance (e.g., R1) along a first current path (e.g., path of current I1 from transistor M3 to the ground through resistor R1), thereby allowing the resistance variations of resistors R1 and R2 and trimming resistors Rt[5:0] to be disregarded. Consequently, the variation of the output reference voltage $V_{REF\_trimmed}$ can be controlled to remain within 1%. Accordingly, the output reference voltage $V_{REF\_trimmed}$, derived by trimming the reference voltage $V_{REF}$, may maintain an accuracy within ±0.5 LSB using either the binary coding scheme or the thermal-meter coding scheme.

Figure 8A:
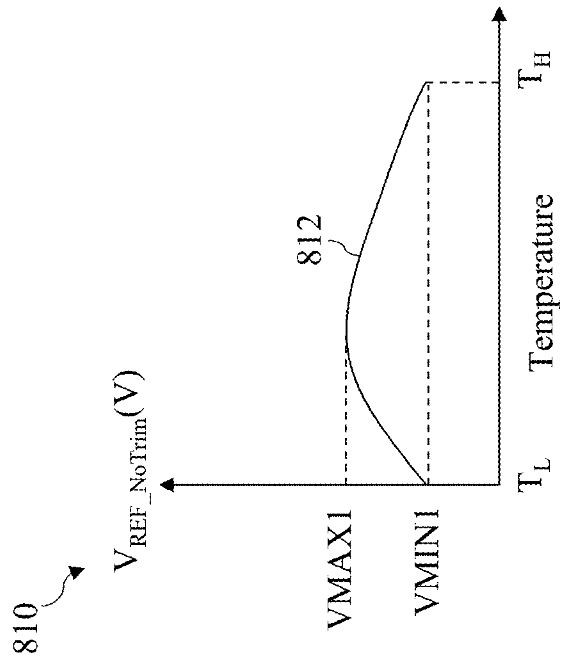
FIGS. 8A to 8C are diagrams illustrating different voltage-temperature curves employing different trimming schemes on the reference voltage, in accordance with some embodiments of the present disclosure.
Figure 8B:
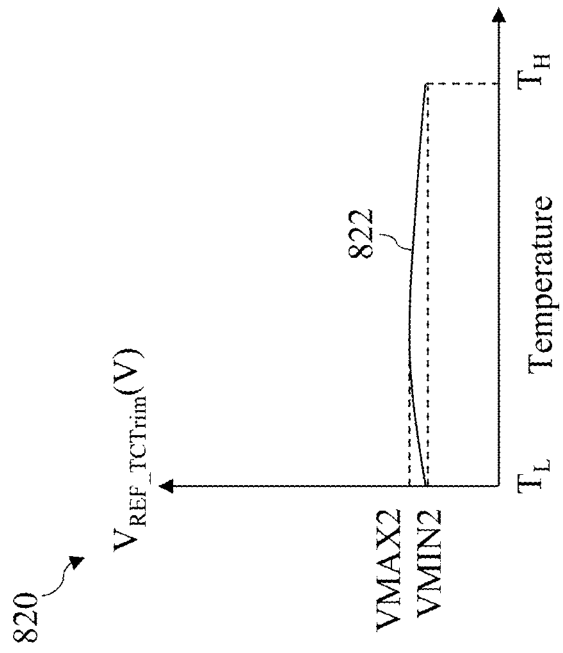
Figure 8C:
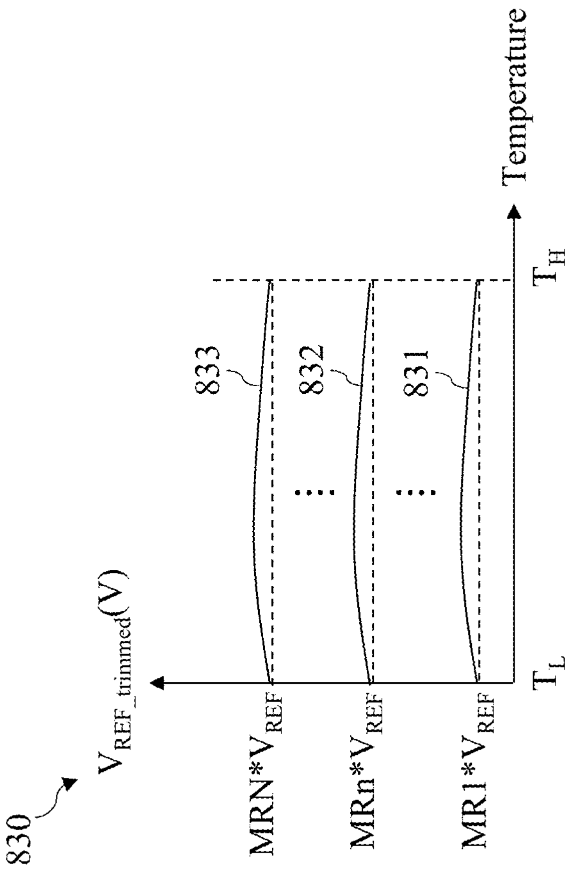

FIGS. 8A to 8C are diagrams illustrating different voltage-temperature curves employing different trimming schemes on the reference voltage, in accordance with some embodiments of the present disclosure. Please refer to FIG. 3 and FIGS. 8A to 8C at the same time.

In some embodiments, the reference voltage $V_{REF}$ generated at node N2, without the utilization of either the temperature-coefficient trimming circuit 340 or the offset trimming circuit 350, referred to as $V_{REF\_NoTrim}$, may exhibit a voltage-temperature curve with an elevated temperature coefficient, as shown by curve 812 in FIG. 8A. For example, the reference voltage $V_{REF\_NoTrim}$ has a maximum voltage VMAX1 and a minimum voltage VMIN1 within the operation temperature voltage between the upper temperature TH and lower temperature $T_L$. Additionally, the reference voltage $V_{REF}$ generated at node N2 with the utilization of the temperature-coefficient trimming circuit 340, referred to as $V_{REF\_TCTrim}$, may exhibit a voltage-temperature curve with a comparatively reduced temperature coefficient, as shown by curve 822 in FIG. 8B. For example, the reference voltage $V_{REF\_TCTrim}$ has a maximum voltage VMAX2 and a minimum voltage VMIN2 within the operation temperature voltage between the upper temperature $T_H$ and lower temperature $T_L$. Moreover, the difference between the maximum voltage VMAX2 and minimum voltage VMIN2 on curve 822 is much smaller than that between the maximum voltage VMAX1 and minimum voltage VMIN1 on curve 812, indicating that the temperature coefficient of the reference voltage $V_{REF\_TCTrim}$ is less than that of the reference voltage $V_{REF\_NoTrim}$. It should be noted that the nominal voltage of the reference voltage $V_{REF\_TCTrim}$ on curve 822 may differ from that on curve 812 of the reference voltage $V_{REF\_NoTrim}$.

In some embodiments, the voltage offset of the reference voltage $V_{REF\_TCTrim}$ can be adjusted by the offset trimming circuit 350. For example, the offset trimming circuit 350 is configured to multiply the reference voltage $V_{REF}$ having the trimmed temperature coefficient (i.e., $V_{REF\_TCTrim}$) using a specific multiplication ratio, such as one of multiplication ratios MR1 to MRN. These multiplication ratios are controlled by the control signal C[5:0], where n is a positive integer between 1 and N. The multiplication ratios MR1 to MRN may correspond to $$\frac{R2 + Rt[5:0]}{R1}$$

as described in the embodiment of FIG. 7. For example, when the Rt[5:0]=6'b0, the R1 multiplication ratio MR1 can be calculated as R2/R1. When the Rt[5:0]=6'b000001, the multiplication ratio MR2 can be calculated as (R2+Rt[0])/R1. The remaining multiplication ratios can be deduced in a similar manner. Specifically, the difference between the maximum voltage and minimum voltage on each of curves 831 to 833 shown in FIG. 8C may be equivalent to that on curve 822 shown in FIG. 8B, with the difference being that the nominal voltages on these curves at the specified temperature (or an average temperature within the operational temperature range) differ.

Figure 9:
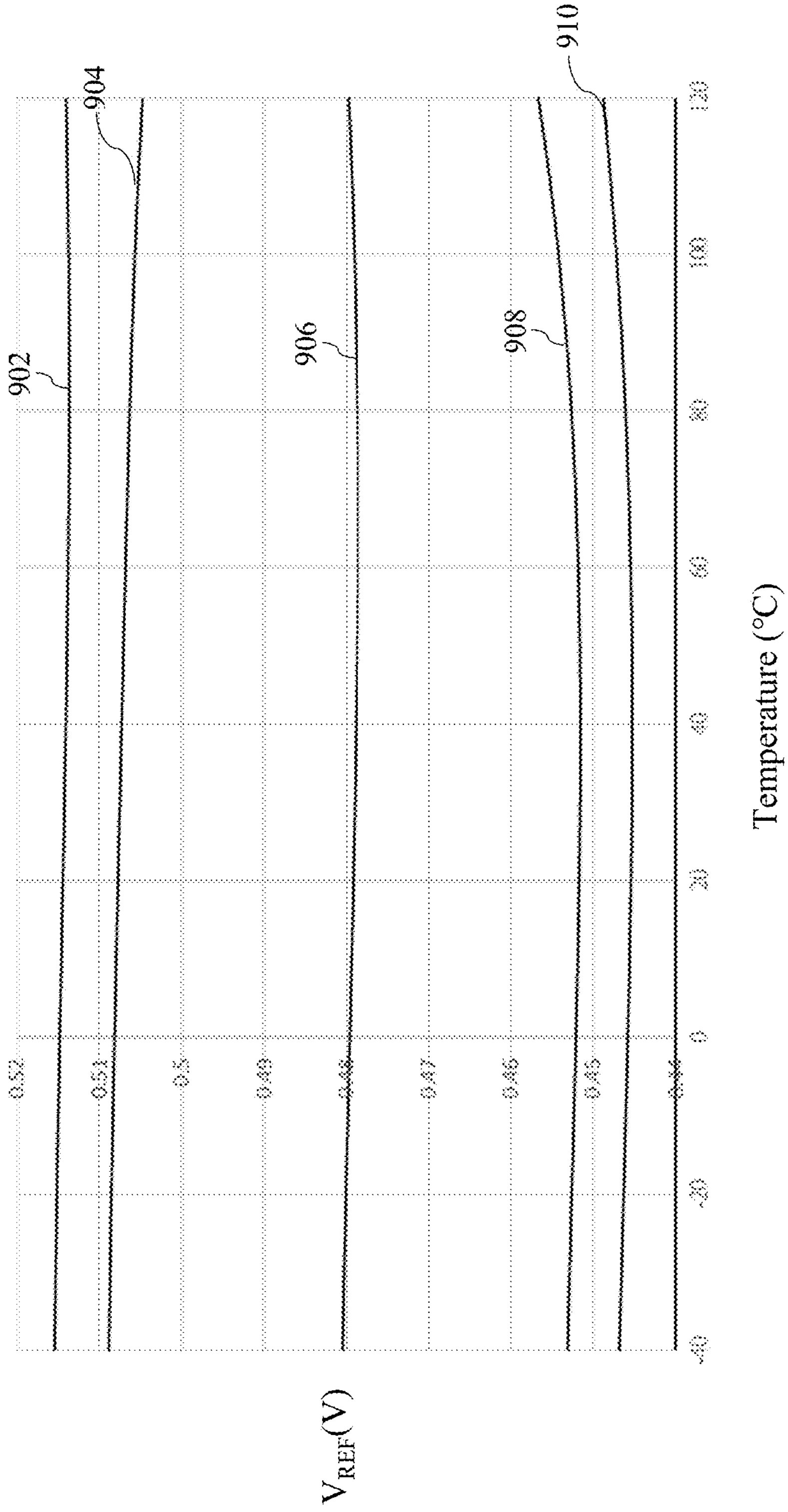
FIG. 9 is a diagram illustrating voltage-temperature curves for different corner cases in accordance with some embodiments of the present disclosure.

FIG. 9 is a diagram illustrating voltage-temperature curves for different corner cases in accordance with some embodiments of the present disclosure.

In some embodiments, due to the variations of the front-end of line (FEOL) process of the voltage reference circuit 300, the N-type and P-type FETs within the voltage reference circuit 300 fabricated on a semiconductor wafer can be in any FEOL case, such as TT, FF, SS, FS, and SF cases, etc., For example, the first letter of each FEOL case denotes the corner type of N-type FETs, while the second letter of each FEOL case denotes the corner type of P-type FETs, where T, F, and S represent to a typical case, a fast corner case, and a slow corner case, respectively. Accordingly, the term TT case refers to the typical-typical case, while the terms FF, SS, FS, and SF refer to fast-fast, slow-slow, fast-slow, and slow-fast corner cases, respectively.

Referring to FIG. 9, curves 902, 904, 906, 908, and 910 correspond to the SS, SF, TT, FS, and FF corner cases, respectively. The nominal voltages at the specified temperature (e.g., 0° C.) on curves 902 to 910 for the SS, SF, TT, FS, and FF corner cases are approximately 0.515V, 0.508V, 0.48V, 0.452V, and 0.445V, respectively. Additionally, the temperature coefficient (TC) of the reference voltage $V_{REF}$ corresponding to TT, FF, SS, FS, and SF cases are illustrated in Table 1 as follows.

TABLE 1

| Case | TT | FF | SS | FS | SF |
|---|---|---|---|---|---|
| TC (ppm/° C.) | 26 | 49 | 21 | 70 | 49 |

For purposes of description, the N-type and P-type FETs within a subsequent integrated circuit of the voltage reference circuit 300 are designed to operate under the TT case. When the N-type and P-type FETs within the voltage reference circuit 300 after fabrication are classified into any of the corner cases, it indicates that the nominal voltage (or average voltage) of the reference voltage $V_{REF}$ generated by the voltage reference voltage circuit 300 may not satisfy the voltage requirements of the subsequent integrated circuit. For example, the temperature-coefficient trimming circuit 340 could trim the first voltage V1 (e.g., PTAT voltage) generated by the temperature-sensitive device 320 (e.g., corresponding to the first voltage source 120 shown in FIG. 1) to adjust the temperature coefficient of the reference voltage $V_{REF}$. However, the temperature-coefficient trimming circuit 340 is not capable of adjusting the offset of the nominal voltage (or average voltage) of the reference voltage $V_{REF}$ to conform to the TT case when it falls within any of corner cases. After the voltage reference circuit 300 is fabricated, the characteristics of the N-type and P-type transistors can be measured to determine the corner case or TT case thereof. Additionally, the difference between the nominal voltages (or average voltages) between the nominal voltage (or the average voltage) of the corner case and the expected voltage level of the TT case can be measured, thereby determining the appropriate control signal C[5:0] to adjust the nominal voltage (or the average voltage) of the corner case to that of the TT case. Accordingly, utilizing the offset trimming circuit 350, the nominal voltage (or average voltage) of the reference voltage $V_{REF}$ after TC trimming at any of corner cases can be adjusted to the voltage level of the TT case with appropriately designed resistances of the resistors R1, R2 and trimming resistors Rt[5:0], thereby enabling the subsequent integrated circuit to function properly. It should be noted that the adjustment for the nominal voltage of the reference voltage $V_{REF}$ at the specified temperature (e.g., 25° C.) also applies to the adjustment of the reference voltage $V_{REF}$ at other temperatures within the operational temperature range.

In some embodiments, the resistance values of the resistors R1 and R2, along with trimming resistors Rt[5:0], can be appropriately designed to ensure that the offset voltage trim range encompasses all corner cases. In some approaches, without the implementation of the offset trimming circuit 350, the voltage level of the reference voltage $V_{REF}$ may exhibit an inaccuracy of 5% and a temperature coefficient less than 100 ppm/° C. For example, a 5% inaccuracy for a voltage level of 0.48V corresponds to a resolution of approximately 24 mV. The voltage reference voltage 300 is capable of providing an output reference voltage $V_{REF}$_trimmed with an inaccuracy of 2.5% or less. For example, a 2.5% inaccuracy for a voltage level of 0.48V corresponds to a resolution of approximately 12 mV. Additionally, when the trimming resistors Rt[5:0] are designed with the binary coding scheme, there can be 64 steps for trimming the offset of the output reference voltage $V_{REF\_trimmed}$, resulting in a trim resolution of approximately 3 mV per least significant bit (LSB) of the control signal C[5:0] with a temperature coefficient less than 100 ppm/° C. Consequently, this trim resolution ensures that the voltage level of the output reference voltage $V_{REF}$ is maintained within ±3 mV of the expected voltage level, satisfying the requirement of a 2.5% inaccuracy of the output reference voltage $V_{REF\_trimmed}$.

Figure 10:
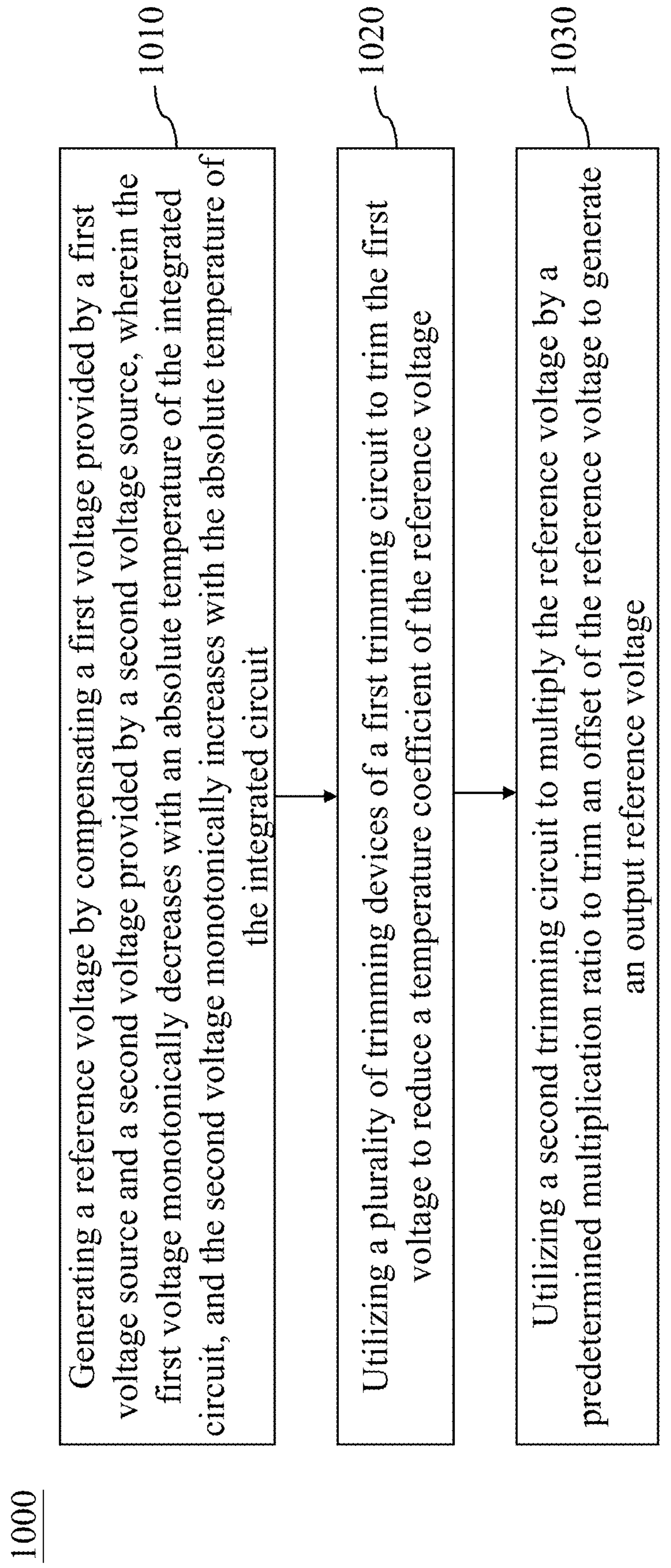
FIG. 10 is a flowchart of a method for operating a voltage reference circuit in accordance with some embodiments of the present disclosure.

FIG. 10 is a flowchart of a method for operating a voltage reference circuit in accordance with some embodiments of the present disclosure. The sequence in which the operations of method 1000 are depicted in FIG. 10 is for illustration only; the operations of method 1000 are capable of being executed in sequences that differ from that depicted in FIG. 10. It is understood that additional operations may be performed before, during, and/or after the method 1000 depicted in FIG. 10, and that some other processes may only be briefly described herein.

In operation 1010, a reference voltage $V_{REF}$ is generated by compensating a first voltage V1 provided by a first voltage source and a second voltage V2 provided by a second voltage source, wherein the first voltage V1 monotonically decreases with an absolute temperature of an integrated circuit (e.g., voltage reference circuit 100 shown in FIG. 1), and the second voltage V2 monotonically increases with the absolute temperature of the integrated circuit. In some embodiments, the first voltage source 120 is a CTAT voltage source, and the first voltage V1 is CTAT. The second voltage source 130 is a PTAT voltage source, and the second voltage V2 is PTAT.

In operation 1020, a plurality of trimming devices of a first trimming circuit are utilized to trim the first voltage to reduce a temperature coefficient of the reference voltage. In some embodiments, the first trimming circuit may refer to the temperature-coefficient trimming circuit 140 shown in FIG. 1, with one possible implementation thereof shown by the temperature-coefficient trimming circuit 340 in FIG. 3. Additionally, with appropriately designed trimming code TC[x:0], the CTAT voltage-temperature curve of the first voltage V1 can be better compensated with the PTAT voltage-temperature curve of the second voltage V2, thereby substantially reducing the temperature coefficient of the reference voltage $V_{REF}$ generated by the voltage reference circuit 100.

In operation 1030, a second trimming circuit is utilized to multiply the reference voltage by a predetermined multiplication ratio to trim an offset of the reference voltage to generate an output reference voltage. In some embodiments, the second trimming circuit may refer to the offset trimming circuit 150 shown in FIG. 1, with on possible implementation thereon shown by the offset trimming circuit 350 in FIG. 3. Additionally, with an appropriately designed control signal C[5:0], the voltage level of the nominal (or average) voltage of the output reference voltage $V_{REF\_trimmed}$ can be adjusted to an expected voltage level, such as the TT case (e.g., an operating case), within the operational temperature range.

An aspect of the present disclosure provides an integrated circuit which includes a first voltage source, a second voltage source, a first trimming circuit, and a second trimming circuit. The first voltage source is configured to generate a first voltage which monotonically decreases with an absolute temperature of the integrated circuit. The second voltage source is configured to generate a second voltage, which monotonically increases with the absolute temperature of the integrated circuit. The second voltage is compensated with the first voltage to generate a reference voltage. The first trimming circuit includes a plurality of trimming devices arranged in parallel to the first voltage source, and is configured to adjust the first voltage using the plurality of trimming devices to reduce a temperature coefficient of the reference voltage. The second trimming circuit is configured to multiply the reference voltage by a predetermined multiplication ratio to adjust an offset of the reference voltage to generate an output reference voltage at an output terminal of the integrated circuit.

Another aspect of the present disclosure provides an integrated circuit which includes a first temperature-sensitive device, a second temperature-sensitive device, a first trimming circuit, and a second trimming circuit. The first temperature-sensitive device is configured to function as a first voltage source varying with an absolute temperature of the integrated circuit. The second temperature-sensitive device is coupled to the first temperature-sensitive device and is configured to function as a second voltage source varying with the absolute temperature of the integrated circuit. The first voltage source is compensated with the second voltage source to generate a reference voltage. The first trimming circuit includes a plurality of trimming devices arranged in parallel to the first voltage source, and is configured to adjust a temperature coefficient of the reference voltage using the plurality of trimming devices. The second trimming circuit is configured to multiply the reference voltage by a predetermined multiplication ratio to adjust an offset of the reference voltage to generate an output reference voltage, with an inaccuracy level lower than that of the reference voltage, at an output terminal of the integrated circuit.

Yet another aspect of the present disclosure provides a method which includes generating a reference voltage using a first voltage and a second voltage. The method includes the following steps: generating a reference voltage by compensating a first voltage provided by a first voltage source with a second voltage provided by a second voltage source. The first voltage is complementary to an absolute temperature of the integrated circuit, and the second voltage is proportional to the absolute temperature of the integrated circuit; utilizing a plurality of trimming devices of a first trimming circuit to trim the first voltage to reduce a temperature coefficient of the reference voltage; and utilizing a second trimming circuit to multiply the reference voltage by a predetermined multiplication ratio to trim an offset of the reference voltage to generate an output reference voltage.

The methods and features of the present disclosure have been sufficiently described in the provided examples and descriptions. It should be understood that any modifications or changes without departing from the spirit of the present disclosure are intended to be covered in the protection scope of the present disclosure.

Moreover, the scope of the present application is not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, can be utilized according to the present disclosure.

Accordingly, the appended claims are intended to include within their scope processes, machines, manufacture, compositions of matter, means, methods or steps. In addition, each claim constitutes a separate embodiment, and the combination of various claims and embodiments are within the scope of the present disclosure.

What is claimed is:

1. An integrated circuit, comprising:

a first voltage source, configured to generate a first voltage which monotonically decreases with an absolute temperature of the integrated circuit; and a second voltage source, configured to generate a second voltage, which monotonically increases with the absolute temperature of the integrated circuit, wherein the second voltage is compensated with the first voltage to generate a reference voltage;

a first trimming circuit, comprising a plurality of trimming devices arranged in parallel to the first voltage source, and configured to adjust the first voltage using the plurality of trimming devices to reduce a temperature coefficient of the reference voltage; and a second trimming circuit, configured to multiply the reference voltage by a predetermined multiplication ratio to adjust an offset of the reference voltage to generate an output reference voltage at an output terminal of the integrated circuit, wherein:

the first voltage source is a complementary to the absolute temperature (CTAT) voltage source implemented using a first temperature-sensitive device;

the second voltage source is a proportional to the absolute temperature (PTAT) voltage source implemented using a second temperature-sensitive device; and the first temperature-sensitive device comprises a first stacked gate device, which comprises one or more first finger structures arranged in parallel, with each first finger structure comprising a first number of field-effect transistors connected in series.

2. The integrated circuit of claim 1, wherein an inaccuracy level of the output reference voltage is lower than that of the reference voltage.

3. The integrated circuit of claim 1, wherein the plurality of trimming devices are trimming stacked gate devices, and the first trimming circuit further comprises:

a plurality of buffer circuits, each buffer circuit configured to be supplied with a voltage at a gate terminal of the first stacked gate device and a ground voltage.

4. The integrated circuit of claim 3, wherein each of the trimming stacked gate devices is controlled by a respective bit of a trimming code signal through a respective one of the buffer circuits.

5. The integrated circuit of claim 4, wherein each of the trimming stacked gate devices comprises a different number of finger structures in powers of 2, and each finger structure within the trimming stacked gate devices comprises the first number of field-effect transistors connected in series.

6. The integrated circuit of claim 4, wherein each of the trimming stacked gate devices comprises an equal number of finger structures, and each finger structure within the trimming stacked gate devices comprises the first number of field-effect transistors connected in series.

7. The integrated circuit of claim 4, wherein:

in response to the respective bit of a specific trimming stacked gate device being in a first logic state, the reference voltage is provided to a gate terminal of the specific trimming stacked gate device through the respective buffer circuit, enabling the specific trimming stacked gate device to couple to the first stacked gate device in parallel; and in response to the respective bit of the specific trimming stacked gate device being in a second logic state complementary to the first logic state, the ground voltage is provided to the gate terminal of the specific trimming stacked gate device through the respective buffer circuit, disabling the specific trimming stacked gate device from coupling to the first stacked gate device in parallel.

8. The integrated circuit of claim 1, wherein the second trimming circuit comprises:

an operational transconductance amplifier, having a first input terminal receiving the reference voltage, a second input terminal coupled to a first node, and an output terminal;

a first transistor, having a gate terminal coupled to the output terminal of the operational transconductance amplifier, a first terminal receiving a power supply voltage, and a second terminal coupled to the first node; and a second transistor, having a gate terminal coupled to the output terminal of the operational transconductance amplifier, a first terminal receiving the power supply voltage, and a second terminal coupled to the output terminal of the integrated circuit.

9. The integrated circuit of claim 8, wherein:

the first node is coupled to a ground through a first resistance, and the output terminal of the integrated circuit is coupled to the ground through a second resistance and a plurality of trimming resistances;

the first transistor and the first resistance constitute a first current path for a first current flowing from the power supply voltage to the ground through the first transistor and the first resistance;

the second transistor, the second resistance, and the trimming resistances constitute a second current path for a second current flowing from the power supply voltage to the ground through the second transistor, the second resistance, and the trimming resistances; and the predetermined multiplication ratio is obtained by dividing a sum of the second resistance and the trimming resistances by the first resistance.

10. The integrated circuit of claim 9, wherein each of the trimming resistances is controlled by a respective bit of a control signal, and the trimming resistances are arranged in a binary coding scheme.

11. The integrated circuit of claim 9, wherein the first resistance, the second resistance, and the trimming resistances are fabricated in a back-end of line (BEOL) process of the integrated circuit.

12. An integrated circuit, comprising:

a first temperature-sensitive device, configured to function as a first voltage source varying with an absolute temperature of the integrated circuit; and a second temperature-sensitive device, coupled to the first temperature-sensitive device, and configured to function as a second voltage source varying with the absolute temperature of the integrated circuit, wherein the first voltage source is compensated with the second voltage source to generate a reference voltage;

a first trimming circuit, comprising a plurality of trimming devices arranged in parallel to the first temperature-sensitive device, and configured to adjust a temperature coefficient of the reference voltage using the plurality of trimming devices; and a second trimming circuit, configured to multiply the reference voltage by a predetermined multiplication ratio to adjust an offset of the reference voltage to generate an output reference voltage, with an inaccuracy level lower than that of the reference voltage, at an output terminal of the integrated circuit, wherein the second trimming circuit comprises:

an operational transconductance amplifier, having a first input terminal receiving the reference voltage, a second input terminal coupled to a first node, and an output terminal;

a first transistor, having a gate terminal coupled to the output terminal of the operational transconductance amplifier, a first terminal receiving a power supply voltage, and a second terminal coupled to the first node; and a second transistor, having gate terminal coupled to the output terminal of the operational transconductance amplifier, a first terminal receiving the power supply voltage, and a second terminal coupled to the output terminal of the integrated circuit.

13. The integrated circuit of claim 12, wherein a first voltage provided by the first voltage source is complementary to the absolute temperature of the integrated circuit, and a second voltage provided by the second voltage source is proportional to the absolute temperature.

14. The integrated circuit of claim 12, wherein:

the first node is coupled to a ground through a first resistance, and the output terminal of the integrated circuit is coupled to the ground through a second resistance and a plurality of trimming resistances;

the first transistor and the first resistance constitute a first current path for a first current flowing from the power supply voltage to the ground through the first transistor and the first resistance;

the second transistor, the second resistance, and the trimming resistances constitute a second current path for a second current flowing from the power supply voltage to the ground through the second transistor, the second resistance, and the trimming resistances;

the predetermined multiplication ratio is obtained by dividing a sum of the second resistance and the trimming resistances by the first resistance; and each of the trimming resistances is controlled by a respective bit of a control signal, and the trimming resistances are arranged in a binary coding scheme.

15. The integrated circuit of claim 14, wherein first resistance, the second resistance, and the trimming resistances are fabricated in a back-end of line (BEOL) process of the integrated circuit.

16. A method, comprising:

generating a reference voltage by compensating a first voltage provided by a first voltage source with a second voltage provided by a second voltage source, wherein the first voltage is complementary to an absolute temperature of an integrated circuit, and the second voltage is proportional to the absolute temperature of the integrated circuit;

utilizing a plurality of trimming devices of a first trimming circuit to trim the first voltage to reduce a temperature coefficient of the reference voltage; and utilizing a second trimming circuit to multiply the reference voltage by a predetermined multiplication ratio to trim an offset of the reference voltage to generate an output reference voltage, wherein the second trimming circuit comprises:

an operational transconductance amplifier, having a first input terminal receiving the reference voltage, a second input terminal coupled to a first node, and an output terminal;

a first transistor, having a gate terminal coupled to the output terminal of the operational transconductance amplifier, a first terminal receiving a power supply voltage, and a second terminal coupled to the first node; and a second transistor, having gate terminal coupled to the output terminal of the operational transconductance amplifier, a first terminal receiving the power supply voltage, and a second terminal coupled to the output terminal of the integrated circuit.

17. The method of claim 16, wherein the utilizing the second trimming circuit to multiply the reference voltage by a predetermined multiplication ratio to trim the offset of the reference voltage to generate the output reference voltage comprises:

calculating a difference between a voltage level of the reference voltage in a corner case and an expected voltage level of an operating case at a specified temperature; and designating a control signal for use by a plurality of trimming resistors within the second trimming circuit to control the predetermined multiplication ratio applied to the reference voltage to generate the output reference voltage.

18. The integrated circuit of claim 12, wherein:

the first voltage source is a complementary to the absolute temperature (CTAT) voltage source implemented using a first temperature-sensitive device; and the second voltage source is a proportional to the absolute temperature (PTAT) voltage source implemented using a second temperature-sensitive device.

19. The integrated circuit of claim 18, wherein the first temperature-sensitive device comprises a first stacked gate device, which comprises one or more first finger structures arranged in parallel, with each first finger structure comprising a first number of field-effect transistors connected in series.

20. The method of claim 16, wherein:

the first voltage source is a complementary to the absolute temperature (CTAT) voltage source implemented using a first temperature-sensitive device;

the second voltage source is a proportional to the absolute temperature (PTAT) voltage source implemented using a second temperature-sensitive device; and the first temperature-sensitive device comprises a first stacked gate device, which comprises one or more first finger structures arranged in parallel, with each first finger structure comprising a first number of field-effect transistors connected in series.

* * * * *